United States Patent
Tomishige

(10) Patent No.: US 11,974,180 B2
(45) Date of Patent: Apr. 30, 2024

(54) WIRELESS RESOURCE ALLOCATION TO SUPPORT LTE eMBMS

(71) Applicant: NEC Corporation, Tokyo (JP)

(72) Inventor: Kazunari Tomishige, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 17/704,224

(22) Filed: Mar. 25, 2022

(65) Prior Publication Data

US 2022/0322179 A1    Oct. 6, 2022

(30) Foreign Application Priority Data

Mar. 31, 2021  (JP) ................................ 2021-059346

(51) Int. Cl.
| | | |
|---|---|---|
| H04W 36/06 | (2009.01) | |
| H04L 5/00 | (2006.01) | |
| H04W 36/20 | (2009.01) | |
| H04W 36/22 | (2009.01) | |

(52) U.S. Cl.
CPC .......... *H04W 36/06* (2013.01); *H04L 5/0041* (2013.01); *H04L 5/006* (2013.01); *H04L 5/0064* (2013.01); *H04W 36/20* (2013.01); *H04W 36/22* (2013.01)

(58) Field of Classification Search
CPC ..... H04L 5/0041; H04L 5/006; H04L 5/0061; H04W 4/06; H04W 28/082; H04W 28/0933; H04W 36/06; H04W 36/20; H04W 36/22; H04W 72/50; H04W 72/52; H04W 72/535; H04W 72/56; H04W 72/563; H04W 76/22; H04W 76/40
See application file for complete search history.

(56) References Cited

U.S. PATENT DOCUMENTS

| | | | |
|---|---|---|---|
| 11,553,457 B2* | 1/2023 | Zhu ...................... | H04W 72/23 |
| 2019/0253902 A1* | 8/2019 | Dhanapal .............. | H04L 5/0098 |
| 2022/0338291 A1* | 10/2022 | Hong ..................... | H04W 4/06 |
| 2023/0029998 A1* | 2/2023 | Narayanan Thangaraj ................. H04W 4/06 | |
| 2023/0156434 A1* | 5/2023 | Mohammed Mikaeil ................... H04W 76/40 370/329 | |

OTHER PUBLICATIONS

3GPP TR 36.743 V0.1.0 (May 2016- 3GPP www.3gpp.org / ftp / Specs / archive / 36_series / 36.743, [Search on Mar. 29, 3rd year of Reiwa], Internet <URL : https://www.3gpp.org/ftp/Specs/archive/36_series/36.743/36743-010.zip>.
3GPP TS 36.440 V16.0.0 (Jul. 2020) 3GPP www.3gpp.org / ftp / Specs / archive / 36_series / 36.440, [Search on Mar. 29, 3rd year of Reiwa], Internet <URL : https://www.3gpp.org/ftp//Specs/archive/36_series/36.440/36440-g00.zip>.

* cited by examiner

*Primary Examiner* — Pao Sinkantarakorn

(57) ABSTRACT

A communication device 1 determines, between a first physical channel and a second physical channel of the communication device 1, an accommodation state of a session in a wireless resource of the first physical channel. The communication device 1 issues an instruction of changing a part of the wireless resource of the first physical channel to a wireless resource of the second physical channel, based on the above-mentioned accommodation state.

16 Claims, 7 Drawing Sheets

WIRELESS RESOURCE ALLOCATION TO SUPPORT LTE eMBMS

This application is based upon and claims the benefit of priority from Japanese Patent Application No. 2021-059346, filed on Mar. 31, 2021, the disclosure of which is incorporated herein in its entirety by reference.

TECHNICAL FIELD

The present disclosure relates to a communication device, a system, and a method.

BACKGROUND ART

LTE Evolved Multimedia Broadcast Multicast Service (eMBMS) is a technique that enables simultaneous data distribution to an unspecified large number of users through use of a technique called Long Term Evolution (LTE) (e.g., NPLs 1 and 2). For example, under a state in which a large number of users gather at one location for a concert, a sport event, or the like, a base station uses eMBMS, thereby enabling to efficiently utilize a wireless resource of the base station and distribute contents to the users. In general, in addition to multicast communication for distributing data to an unspecified large number of users, a base station supporting eMBMS also supports unicast communication for performing communication with a specified single user. A wireless resource allocated to a physical channel for multicast is used for multicast communication, and a wireless resource allocated to a physical channel for unicast is used for unicast communication.

[NPL 1]
3GPP www.3gpp.org/ftp/Specs/archive/36_series/36.743, [retrieved on Mar. 29, 2021], the Internet
<URL: https://www.3gpp.org/ftp/Specs/archive/36_series/36.743/36743-010.zip>

[NPL2]
3GPP www.3gpp.org/ftp/Specs/archive/36_series/36.440, [retrieved on Mar. 29, 2021], the Internet
<URL: https://www.3gpp.org/ftp//Specs/archive/36_series/36.440/36440-g00.zip>

SUMMARY

An example object of the present disclosure is to provide a communication device, a system, and a method that are able to improve flexibility in allocating a wireless resource to a physical channel.

It should be noted that this object is merely one of a plurality of objects that a plurality of example embodiments to be disclosed herein attempt to achieve. Other objects, or problems and novel features are clarified in description of this specification or attached drawings.

A communication device according to an example aspect of the present disclosure is a communication device configured to support LTE Evolved Multimedia Broadcast Multicast Service (eMBMS), and includes: a determination unit configured to determine, between a first physical channel and a second physical channel one of which is a physical channel for unicast and another of which is a physical channel for multicast, an accommodation state of a session in a wireless resource of the first physical channel; and an allocation instruction unit configured to instruct an allocation unit to change a part of the wireless resource of the first physical channel to a wireless resource of the second physical channel, according to the accommodation state, the allocation unit being configured to allocate a wireless resource to each of the first physical channel and the second physical channel.

A communication device according to an example aspect of the present disclosure is a communication device configured to support LTE Evolved Multimedia Broadcast Multicast Service (eMBMS), and includes an allocation unit configured to allocate a wireless resource to each of a first physical channel and a second physical channel. The allocation unit receives an instruction of changing a part of a wireless resource of the first physical channel to a wireless resource of the second physical channel from an allocation instruction unit, and executes a content of the instruction.

A system according to an example aspect of the present disclosure is a system configured to support LTE Evolved Multimedia Broadcast Multicast Service (eMBMS), and includes: a determination unit configured to determine, between a first physical channel and a second physical channel one of which is a physical channel for unicast and another of which is a physical channel for multicast, an accommodation state of a session in a wireless resource of the first physical channel; an allocation unit configured to allocate a wireless resource to each of the first physical channel and the second physical channel; and an allocation instruction unit configured to instruct the allocation unit to change a part of the wireless resource of the first physical channel to a wireless resource of the second physical channel, according to the accommodation state.

A method according to an example aspect of the present disclosure is a method for a communication device configured to support LTE Evolved Multimedia Broadcast Multicast Service (eMBMS), and includes: determining, between a first physical channel and a second physical channel one of which is a physical channel for unicast and another of which is a physical channel for multicast, an accommodation state of a session in a wireless resource of the first physical channel; and instructing an allocation unit to change a part of the wireless resource of the first physical channel to a wireless resource of the second physical channel, according to the accommodation state, the allocation unit being configured to allocate a wireless resource to each of the first physical channel and the second physical channel.

A method according to an example aspect of the present disclosure is a method for a communication device configured to support LTE Evolved Multimedia Broadcast Multicast Service (eMBMS), and includes: allocating a wireless resource to each of a first physical channel and a second physical channel; receiving an instruction of changing a part of a wireless resource of the first physical channel to a wireless resource of the second physical channel from an allocation instruction unit; and executing a content of the instruction.

BRIEF DESCRIPTION OF THE DRAWINGS

Exemplary features and advantages of the present disclosure will become apparent from the following detailed description when taken with the accompanying drawings in which.

EXAMPLE EMBODIMENT

With reference to the drawings, specific example embodiments will be described below in detail. In each of the drawings, the same or related elements are denoted with the same reference symbols, and overlapping description is omitted as required in order to simplify the description.

The example embodiments to be given below may be carried out independently, or may be carried out in combination as appropriate. The plurality of example embodiments have novel features different from each other. Therefore, the plurality of example embodiments contribute to achieving objects different from each other or solving problems different from each other, and contribute to exerting effects different from each other.

First Example Embodiment

Figure 1:
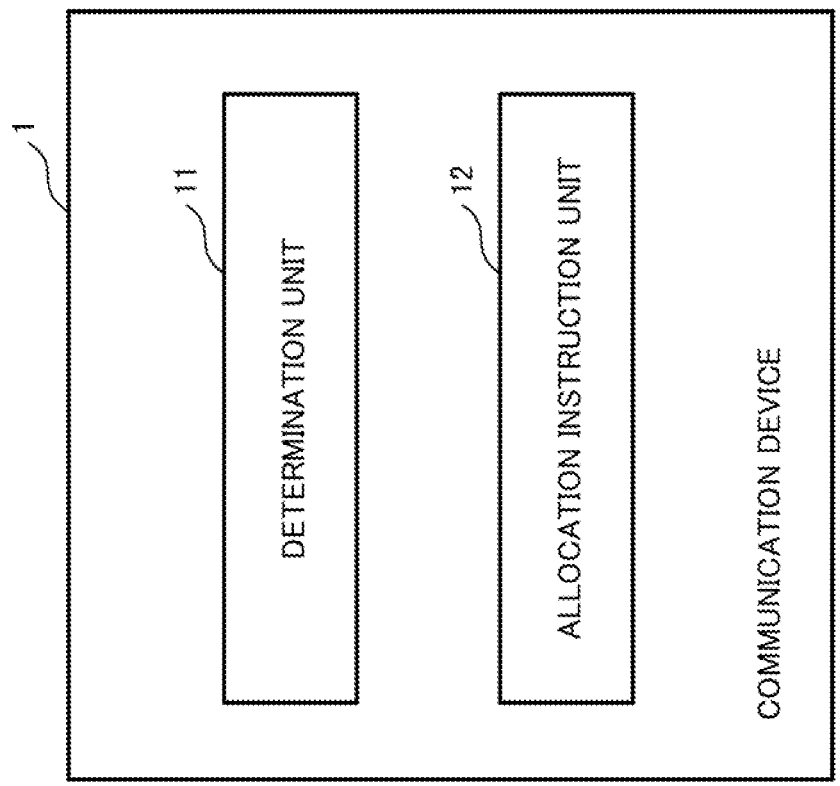
FIG. 1 is an explanatory diagram for explaining an example of a communication device 1 according to a first example embodiment.
Figure 2:
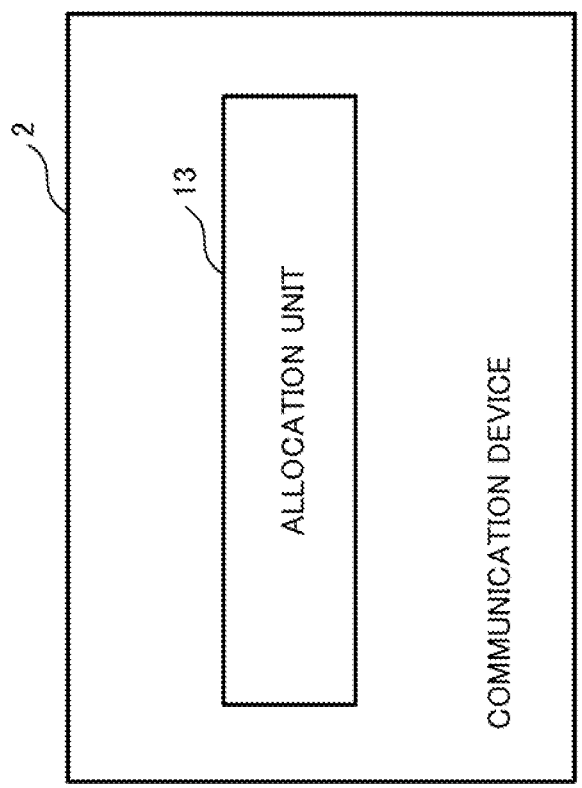
FIG. 2 is an explanatory diagram for explaining an example of a communication device 2 according to the first example embodiment.

FIG. 1 illustrates a configuration example of a communication device 1 according to the present example embodiment, and FIG. 2 illustrates a configuration example of a communication device 2 according to the present example embodiment. Each of elements illustrated in FIGS. 1 and 2 may be implemented as, for example, dedicated hardware, software operated on dedicated hardware, or a virtual function that is instantiated on an application platform operated on general hardware. For example, the communication device 2 may be a base station that supports a communication system specified in Third Generation Partnership Project (3GPP), such as Long Term Evolution (LTE) and New Radio (NR), or a service such as LTE Evolved Multimedia Broadcast Multicast Service (eMBMS), and the communication device 1 may be a communication device that is connected to the base station. The base station is connected to a terminal device and a core network that support, for example, LTE, NR, or eMBMS.

In FIG. 1, the communication device 1 is a communication device that supports LTE Evolved Multimedia Broadcast Multicast Service (eMBMS), and includes a determination unit 11 and an allocation instruction unit 12.

The determination unit 11 is configured in such a way as to determine, between a first physical channel and a second physical channel included in the communication device 2, an accommodation state of a session in a wireless resource of the first physical channel. One of the first physical channel and the second physical channel that are described above is a physical channel for unicast, and another thereof is a physical channel for multicast.

The allocation instruction unit 12 is configured in such a way as to instruct an allocation unit 13 that allocates a wireless resource to each of the first physical channel and the second physical channel to change a part of the wireless resource of the first physical channel to the wireless resource of the second physical channel, according to the above-mentioned accommodation state.

In FIG. 2, the communication device 2 is a communication device that supports LTE Evolved Multimedia Broadcast Multicast Service (eMBMS), and includes the allocation unit 13. The communication devices 1 and 2 form a system that supports LTE Evolved Multimedia Broadcast Multicast Service (eMBMS).

The allocation unit 13 is configured in such a way as to change a part of the wireless resource of the first physical channel to the wireless resource of the second physical channel, based on the instruction received from the allocation instruction unit 12. "The part of the wire resource" described above may indicate a sub-frame, and is not limited thereto.

Figure 3:
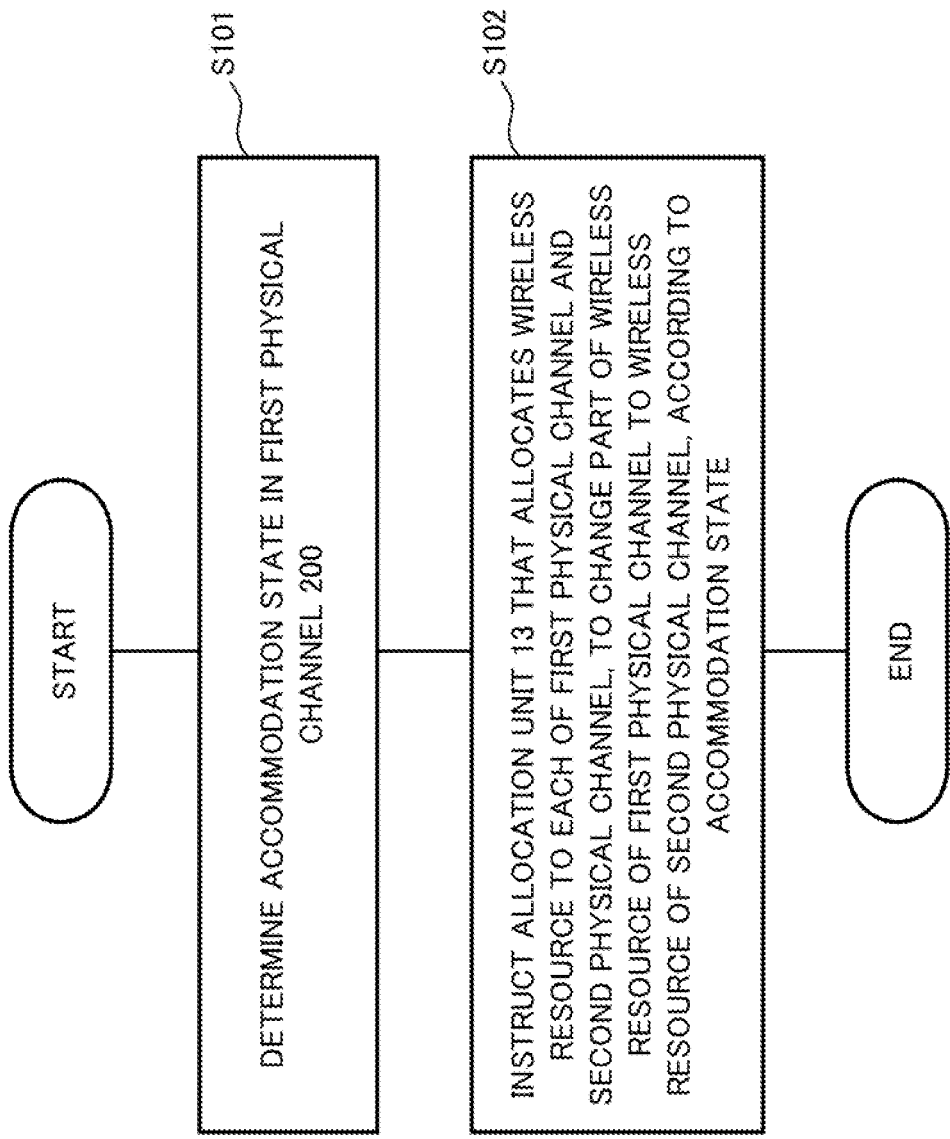
FIG. 3 is a sequence diagram for explaining an operation example of the communication device 1 according to the first example embodiment.

Subsequently, with reference to FIG. 3, description is made on an operation example of the communication device 1 according to the first example embodiment. FIG. 3 is a sequence diagram illustrating the operation example of the communication device 1 according to the first example embodiment.

First, the determination unit 11 determines, between a first physical channel 200 and a second physical channel 201 included in the communication device 2, an accommodation state of the first physical channel 200 (S101).

The allocation instruction unit 12 instructs the allocation unit 13 that allocates the wireless resource to each of the first physical channel and the second physical channel to change a part of the wireless resource of the first physical channel to the wireless resource of the second physical channel, according to the accommodation state (S102).

As described above, the communication device 1 is capable of changing a part of the wireless resource allocated to the first physical channel to the wireless resource of the second physical channel, according to the accommodation state of the first physical channel in the communication device 2. Therefore, flexibility in allocating a wireless resource to a physical channel can be improved.

In the description given above, it is assumed that the determination unit 11 and the allocation instruction unit 12, and the allocation unit 13 are included in the separate devices (specifically, the communication device 1 and the communication device 2), but the present disclosure is not limited thereto. For example, all of the determination unit 11, the allocation instruction unit 12, and the allocation unit 13 may be included in one communication device. The one communication device may be a base station that supports LTE, NR, or eMBMS.

In other words, regardless of whether the determination unit 11 and the allocation instruction unit 12, and the allocation unit 13 are included in the same device or in the difference devices, it is only required that the determination unit 11 be capable of determining, between the first physical channel and the second physical channel, an accommodation state of a session in the wireless resource of the first physical channel and that the allocation instruction unit 12 be capable of instructing the allocation unit 13 that allocates the wireless resource to each of the first physical channel and the second physical channel to change a part of the wireless resource of the first physical channel to the wireless resource of the second physical channel, according to the accommodation state.

Second Example Embodiment

Figure 4:
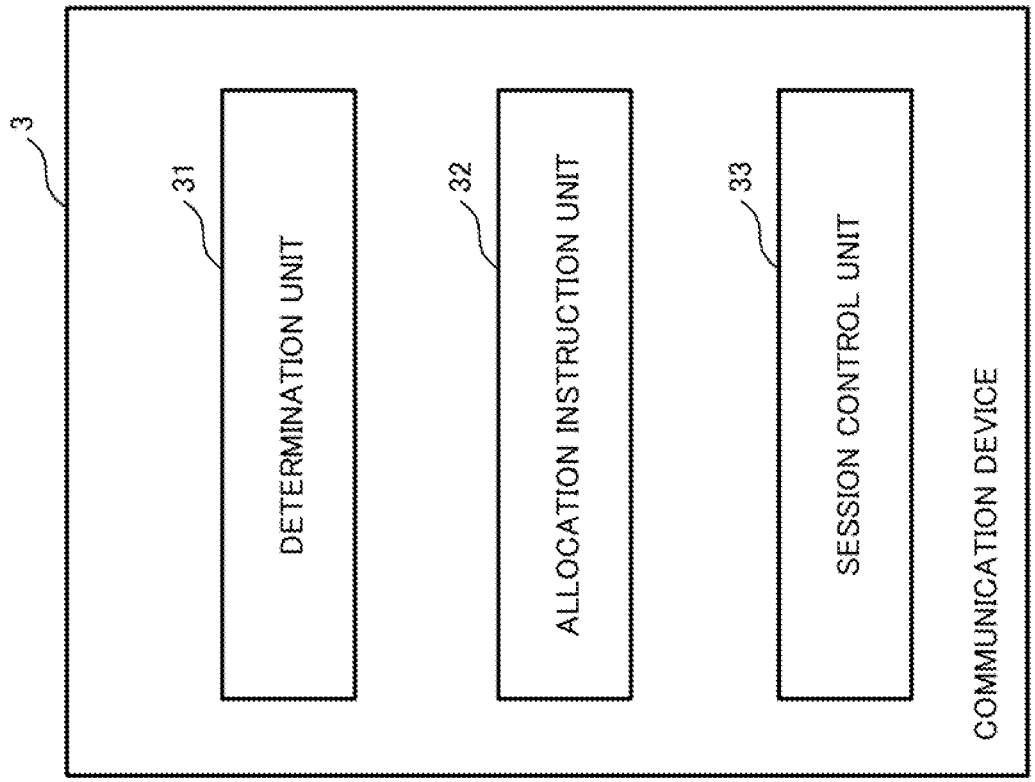
FIG. 4 is an explanatory diagram for explaining an example of a communication device 3 according to a second example embodiment.
Figure 5:
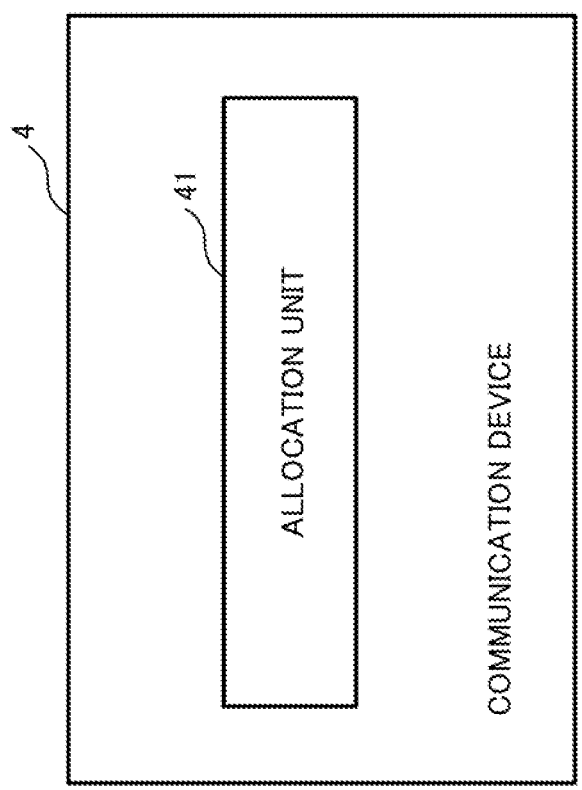
FIG. 5 is an explanatory diagram for explaining an example of a communication device 4 according to the second example embodiment.

FIG. 4 illustrates a configuration example of a communication device 3 according to the present example embodiment, and FIG. 5 illustrates a configuration example of a communication device 4 according to the present example embodiment. The communication device 3 is associated to the communication device 1 according to the first example embodiment, and the communication device 4 is associated to the communication device 2 according to the first example embodiment.

For example, the communication device 4 may be a base station that supports a communication system specified in Third Generation Partnership Project (3GPP), such as Long Term Evolution (LTE) and New Radio (NR), or a service such as LTE Evolved Multimedia Broadcast Multicast Service (eMBMS), and the communication device 3 may be a communication device that is connected to the base station. The base station is connected to a terminal device and a core network that support, for example, LTE, NR, or eMBMS.

In FIG. 4, the communication device 3 includes a determination unit 31, an allocation instruction unit 32, and a session control unit 33.

The determination unit 31 is associated to the determination unit 11 of the first example embodiment. The determination unit 31 determines, between a first physical channel and a second physical channel that are included in the communication device 4, an "accommodation state of a session in the wireless resource of the first physical channel". In the following description, this determination is referred to as an "accommodation state determination" in some cases. One of the first physical channel and the second physical channel that are described above is a physical channel for unicast, and another thereof is a physical channel for multicast.

Examples of the "accommodation state of the session in the wireless resource of the first physical channel" includes a state in which, even when a part of the wireless resource of the first physical channel is changed to the wireless resource of the second physical channel, it is not required to release the session that is already accommodated in the wireless resource of the first physical channel and is associated to a priority degree higher than a predetermined level (hereinafter, also referred to as a "first accommodation state" in some cases). Examples of the "accommodation state of the session in the wireless resource of the first physical channel" also include a state in which, when a part of the wireless resource of the first physical channel is changed to the wireless resource of the second physical channel, it is required to release the session that is already accommodated in the wireless resource of the first physical channel and is associated to a priority degree higher than the predetermined level (hereinafter, also referred to as a "second accommodation state" in some cases).

Herein, the determination unit 31 may execute the above-mentioned "accommodation state determination" when a predetermined condition (hereinafter, also referred to as a "first condition" in some cases) is satisfied, as a trigger. For example, the "first condition" may include one of or both of a condition where there is no room for a new session in the wireless resource of the second physical channel (hereinafter, also referred to as a "second condition" in some cases) and a condition where an allocation amount of the wireless resource of the second physical channel before the change does not reach an "upper limit value" (hereinafter, also referred to as a "third condition" in some cases). The above-mentioned upper limit value may be a value specified in 3GPP, or may be a value set by an operator of the communication device 3. When the "first condition" includes the "second condition" and the "third condition", an order of determining the "second condition" and the "third condition" is not particularly limited, but the "second condition" and the "third condition" may be determined in the stated order. When both the "second condition" and the "third condition" are satisfied, the "accommodation state determination" is executed. The determination unit 31 may execute determination of the "first condition" and the "accommodation state determination" when the first physical channel is a physical channel for unicast, the second physical channel is a physical channel for multicast, and the second physical channel receives an access from a multicast session with a high priority degree (e.g., a high urgency degree), as a trigger. Alternatively, the "accommodation state determination" may be executed when, instead of using the "first condition" as a trigger, the first physical channel is a physical channel for unicast, the second physical channel is a physical channel for multicast, and the second physical channel receives an access from a multicast session with a high priority degree (e.g., a high urgency degree), as a trigger. With this, communication with a user having high urgency can be secured. For the determination of a priority degree of a session, "information for identifying a session" retained in the session control unit 33, which will be described later, may be used.

The allocation instruction unit 32 is associated to the allocation instruction unit 12 of the first example embodiment. When, in the above-mentioned "accommodation state determination", the "accommodation state of the session in the wireless resource of the first physical channel" is determined as the "first accommodation state", the allocation instruction unit 32 instructs an allocation unit 41 to change a part of the wireless resource of the first physical channel to the wireless resource of the second physical channel. With this, for example, allocation of the wireless resource between the first physical channel and the second physical channel is re-adjusted. The allocation instruction unit 32 may designate a sub-frame allocated to the first physical channel, which is a target to be changed to the wireless resource of the second physical channel. Specifically, the allocation instruction unit 32 may perform control in such a way that a part of the wireless resource of the first physical channel is changed to the wireless resource of the second physical channel by a sub-frame unit. The number of sub-frames allocated to the first physical channel, which are changed to the wireless resource of the second physical channel at one time, may be one or plural.

Herein, the allocation instruction unit 32 may instruct the allocation unit 41 to change a part or entirety of the wireless resource in the second physical channel, which does not accommodate a session, to the first physical channel in a periodical manner. Based on this instruction, allocation of the wireless resource to the second physical channel is revised in a periodical manner. With this, allocation of the wireless resource to the first physical channel is secured.

For example, when Expression (1) given below is satisfied, the allocation instruction unit 32 may change a sub-frame in the second physical channel to the first physical channel.

[Math. 1]

$$D_m - \Sigma_{A_m} B_m(A_m) \geq E_m \tag{1}$$

Herein, $A_m$ indicates a priority degree of a multicast session, $B_m$ indicates the number of multicast sessions, $D_m$ indicates the maximum number of accommodatable sessions in multicast, and $E_m$ indicates the maximum number of accommodatable sessions for one sub-frame in multicast. Specifically, in this case, as an example, it is assumed that the first physical channel is a physical channel for unicast and the second physical channel is a physical channel for multicast.

When, in the above-mentioned "accommodation state determination", the "accommodation state of the session in the wireless resource of the first physical channel" is determined as the "second accommodation state", the session control unit 33 releases a session that is accommodated in the second physical channel and is associated to a "priority degree lower than the predetermined level", and causes the second physical channel to accommodate a new session. For example, the above-mentioned "priority degree lower than the predetermined level" is a priority degree lower than a priority degree of a target session that is newly accommodated in the second physical channel. Specifically, the session control unit 33 may release a session while considering a priority degree of a session to be newly accommodated. For example, a priority degree of a session that the second physical channel is required to newly accommodate is determined, and a session in the second physical channel, which has a priority degree lower than the priority degree of the session, may be released.

The session control unit 33 is configured in such a way to store the above-mentioned information for identifying a session that is accommodated in the second physical channel.

In FIG. 5, the communication device 4 includes the allocation unit 41. The allocation unit 41 is associated to the allocation unit 13 of the first example embodiment. The allocation unit 41 changes a part of the wireless resource of the first physical channel to the wireless resource of the second physical channel, based on the instruction received from the allocation instruction unit 32. As described above, the instruction from the allocation instruction unit 32 may indicate a sub-frame allocated to the first physical channel, which is a target to be changed to the wireless resource of the second physical channel. Specifically, the allocation unit 41 may change a part of the wireless resource of the first physical channel to the wireless resource of the second physical channel by a sub-frame unit, based on the instruction received from the allocation instruction unit 32.

Figure 6:
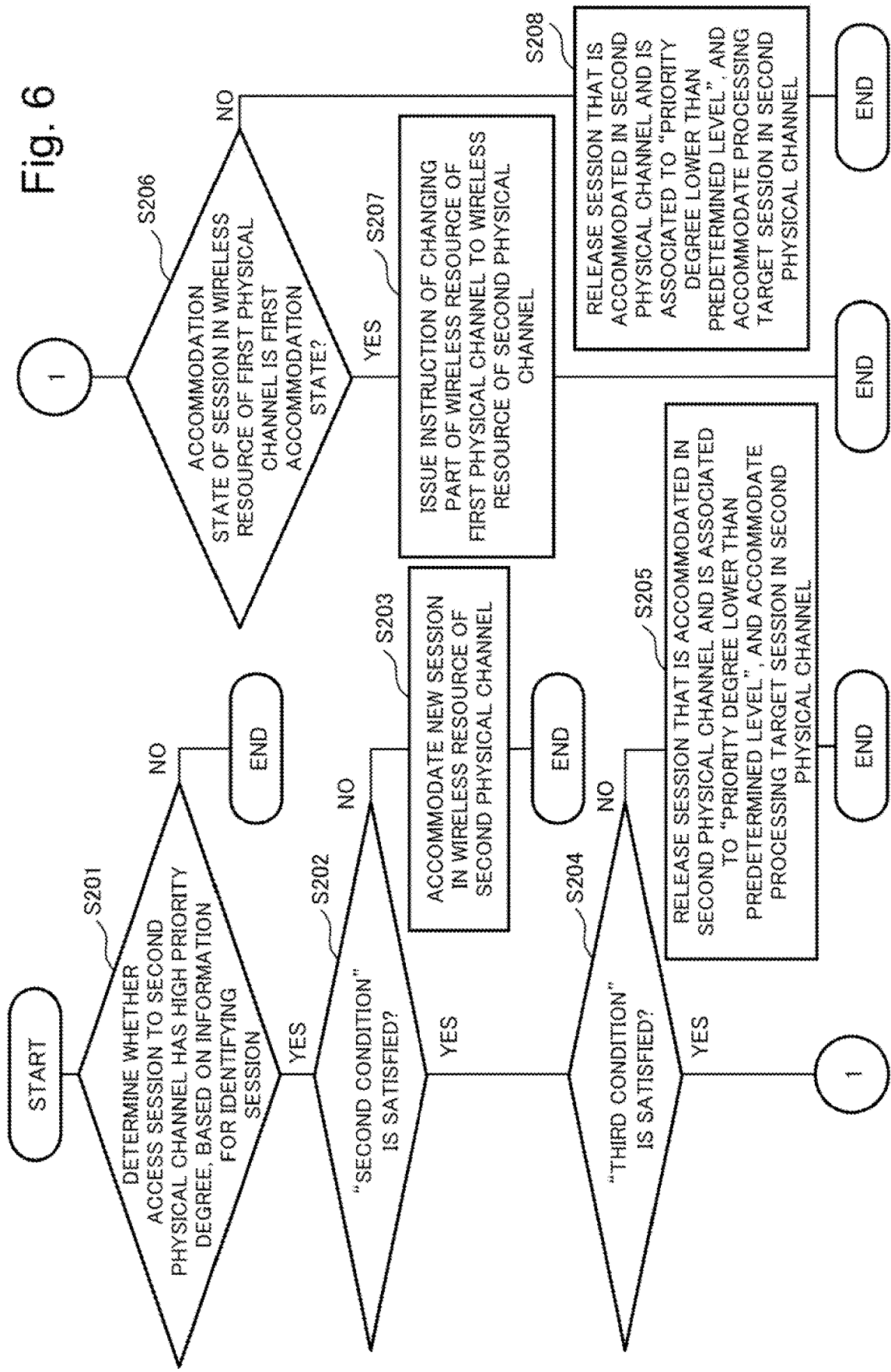
FIG. 6 is a flowchart for explaining an operation example of the communication device 3 according to the second example embodiment.

Next, with reference to FIG. 6, description is made on an operation example of the communication device 3 according to the second example embodiment. FIG. 6 is a flowchart illustrating the operation example of the communication device 3 according to the second example embodiment. Herein, the first physical channel is a physical channel for unicast and the second physical channel is a physical channel for multicast, and a specific example in which the second physical channel receives an access from a multicast session (e.g., an eMBMS session) with a high priority degree (e.g., a high urgency degree) is also described together.

First, the determination unit 31 determines whether an access session to the second physical channel (specifically, a processing target session) has a high priority degree, based on the information for identifying a session, which is stored in the session control unit 33 (S201). When the access session to the second physical channel does not have a high priority degree (NO in S201), the processing flow is terminated.

When the access session to the second physical channel has a high priority degree (YES in S201), the determination unit 31 determines whether the above-mentioned "second condition" is satisfied (S202). As described above, the "second condition" is a condition where there is no room for a new session in the wireless resource of the second physical channel. For example, the determination unit 31 may determine whether the above-mentioned "second condition" is satisfied, based on Expression (2) given below.

[Math. 2]

$$\Sigma_{A_m} B_m(A_m) \geq D_m \quad (2)$$

Herein, $A_m$ indicates a priority degree of a multicast session, $B_m$ indicates the number of multicast sessions, and $D_m$ indicates the maximum number of accommodatable sessions in multicast.

When it is determined that the "second condition" is not satisfied (NO in S202), the session control unit 33 causes the wireless resource of the second physical channel to accommodate the processing target session (S203).

When it is determined that the "second condition" is satisfied (YES in S202), the determination unit 31 determines whether the above-mentioned "third condition" is satisfied (S204). As described above, the "third condition" is a condition where an allocation amount of the wireless resource of the second physical channel before the change does not reach the "upper limit value". For example, the determination unit 31 may determine whether the above-mentioned "third condition" is satisfied, based on Expression (3) given below.

[Math. 3]

$$6.\text{Subframe} \geq C_m \quad (3)$$

Herein, $C_m$ indicates the maximum number of eMBMS sub-frames in a channel for multicast, and 6.subframe indicates that the number of sub-frames is six.

When it is determined that the "third condition" is not satisfied (NO in S204), the session control unit 33 releases a session that is accommodated in the second physical channel and is associated to the "priority degree lower than the predetermined level", and causes the second physical channel to accommodate the processing target session (S205).

When it is determined that the "third condition" is satisfied (YES in S204), the determination unit 31 executes the "accommodation state determination" (S206). Specifically, the determination unit 31 determines whether the "accommodation state of the session in the wireless resource of the first physical channel" is the "first accommodation state". For example, the determination unit 31 may execute the "accommodation state determination", based on Expression (4) given below.

[Math. 4]

$$D_u(n-1) \geq B_u(A_u = \text{High}) \quad (4)$$

Herein, $A_u$ indicates a priority degree of a unicast session, $B_u(A_u)$ indicates the number of multicast sessions, and $D_u$ indicates the number of accommodated sessions of unicast when the number of sub-frames for unicast is n. Specifically, Expression (4) indicates that, when n sub-frames are currently allocated to the first physical channel and the number of sub-frames is reduced by one, thereby forming (n−1) sub-frames, a session with a high priority degree can be accommodated in the (n−1) sub-frames.

When it is determined that the "accommodation state of the session in the wireless resource of the first physical channel" is the "first accommodation state" (YES in S206), the allocation instruction unit 32 instructs the allocation unit 41 to change a part of the wireless resource of the first physical channel to the wireless resource of the second physical channel (S207). Then, the session control unit 33 causes the wireless resource of the second physical channel to accommodate the processing target session.

When it is determined that the "accommodation state of the session in the wireless resource of the first physical channel" is not the "first accommodation state", in other words, it is the "second accommodation state" (NO in S206), the session control unit 33 releases a session that is accommodated in the second physical channel and is associated to the "priority degree lower than the predetermined level", and causes the second physical channel to accommodate the processing target session (S208).

As described above, the communication device 3 is capable of changing a part of the wireless resource allocated to the first physical channel to the wireless resource of the second physical channel, according to the accommodation state of the first physical channel in the communication device 4. Therefore, flexibility in allocating a wireless resource to a physical channel can be improved.

In the description given above, it is assumed that the determination unit 31, the allocation instruction unit 32, and the session control unit 33, and the allocation unit 41 are included in the separate devices (specifically, the communication device 3 and the communication device 4), but the present disclosure is not limited thereto. For example, all the determination unit 31, the allocation instruction unit 32, the session control unit 33, and the allocation unit 41 may be included in one communication device. The one communication device may be a base station that supports LTE, NR, or eMBMS.

In other words, regardless of whether the determination unit 31, the allocation instruction unit 32, and the session control unit 33, and the allocation unit 41 are included in the same device or in the different devices, it is only required that the determination unit 31 be capable of determining, between the first physical channel and the second physical channel, an accommodation state of a session in the wireless resource of the first physical channel, that the allocation instruction unit 32 be capable of instructing the allocation unit 41 that allocates the wireless resource to each of the first physical channel and the second physical channel to change a part of the wireless resource of the first physical channel to the wireless resource of the second physical channel, according to the accommodation state, and that the session control unit 33 be capable of releasing the session according to the accommodation state.

Herein, the determination unit 31, the allocation instruction unit 32, and the session control unit 33, which have been described above, may be included in a Radio Resource Management (RRM) function unit. The allocation unit 41 described above may be included in an Operation and Maintenance (O&M) function unit.

Other Example Embodiments

Figure 7:
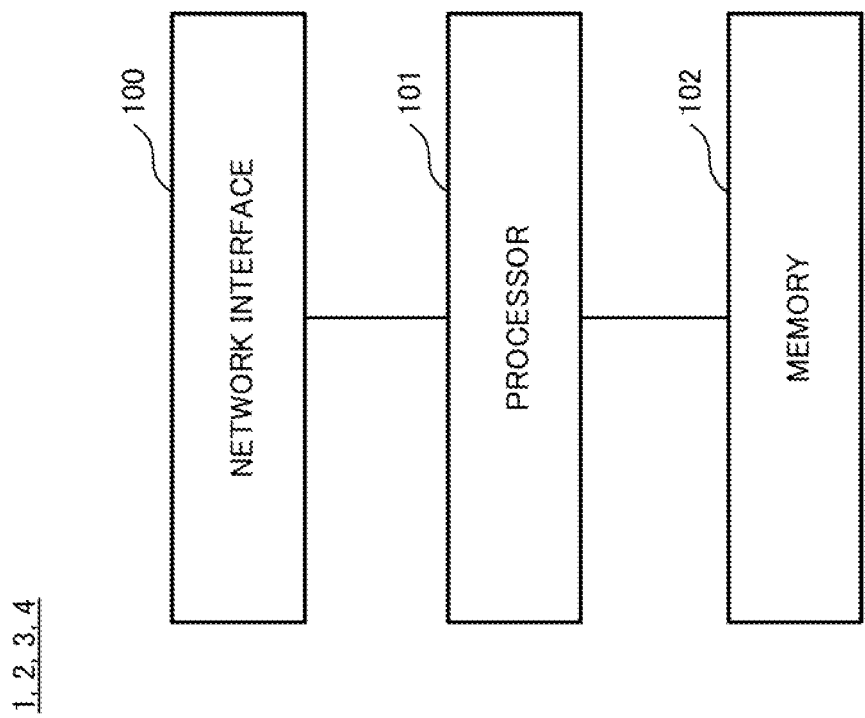
FIG. 7 is an explanatory diagram for explaining a configuration example of the communication device according to each of the example embodiments.

The communication devices 1, 2, 3, and 4 (hereinafter, referred to as the communication device 1 and the like) according to the example embodiments described above may have a hardware configuration as described below. FIG. 7 is a block diagram illustrating a hardware configuration of a computer (an information processing device) capable of achieving the communication device according to each of the example embodiments.

With reference to FIG. 7, the communication device 1 and the like include a network interface 100, a processor 101, and a memory 102. The network interface 100 is used in order to establish communication with other wireless communication devices including a plurality of communication terminals. The network interface 100 may include a network interface card (NIC) conforming to IEEE 802.11 series, IEEE 802.3 series, or the like.

The processor 101 reads software (a computer program) out from the memory 102 and executes the software, thereby executing processing of the communication device 1 and the like, which is described in the above-mentioned example embodiments with reference to the flowcharts and the sequence diagrams. For example, the processor 101 may be a microprocessor, a Micro Processing Unit (MPU), or a Central Processing Unit (CPU). The processor 101 may include a plurality of processors.

The memory 102 is composed of a combination of a volatile memory and a non-volatile memory. The memory 102 may include a storage arranged away from the processor 101. In this case, the processor 101 may access the memory 102 via an I/O interface that is not illustrated.

In the example of FIG. 7, the memory 102 is used in order to store a software module group. The processor 101 reads the software module group out from the memory 102 and executes the software module group, thereby being capable of executing the processing of the communication device 1 and the like, which is described in the above-mentioned example embodiments.

As described with reference to FIG. 7, each of the processors included in the communication device 1 and the like executes one or a plurality of programs including an instruction group for causing a computer to execute algorithms described with reference to the drawings.

In the above-mentioned example, the program can be stored through use of various types of a non-transitory computer readable medium, and can be supplied to a computer. The non-transitory computer readable medium includes various types of tangible storage media. Examples of the non-transitory computer readable medium include a magnetic recording medium (e.g., a flexible disk, a magnetic tape, and a hard disk drive) and a magneto-optical recording medium (e.g., a magneto-optical disk). Examples of the non-transitory computer readable medium further include a CD-Read Only Memory (ROM), CD-R, and CD-R/W. Examples of the non-transitory computer readable medium further include a semiconductor memory. Examples of the semiconductor memory include a mask ROM, a Programmable ROM (PROM), an Erasable PROM (EPROM), a flash ROM, and a Random Access Memory (RAM). The program may be supplied to a computer from various types of transitory computer readable media. Examples of the transitory computer readable medium include an electrical signal, an optical signal, and an electromagnetic wave. The transitory computer readable medium is capable of supplying the program to a computer via a wired communication path such as an electric wire and an optical fiber, or a wireless communication path.

In a base station that supports eMBMS, allocation of a sub-frame to a physical channel for multicast and a physical channel for unicast is semi-fixed, and hence flexibility in allocating a wireless resource to a physical channel is low. This problem arises not only in eMBMS, but also in a plurality of physical channels to which a wireless resource is allocated in a semi-fixed manner. According to the present disclosure, for example, there can be provided the communication device, the system, and the method that are able to improve flexibility in allocating a wireless resource to a physical channel.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

The whole or a part of the example embodiments disclosed above can be described as, but not limited to, the following supplementary notes.

(Supplementary Note 1)

A communication device configured to support LTE Evolved Multimedia Broadcast Multicast Service (eM-BMS), the communication device including:

a determination unit configured to determine, between a first physical channel and a second physical channel one of which is a physical channel for unicast and another of which is a physical channel for multicast, an accommodation state of a session in a wireless resource of the first physical channel; and an allocation instruction unit configured to instruct an allocation unit to change a part of a wireless resource of the first physical channel to a wireless resource of the second physical channel, according to the accommodation state, the allocation unit being configured to allocate a wireless resource to each of the first physical channel and the second physical channel.

(Supplementary Note 2)

The communication device according to Supplementary Note 1, wherein the allocation instruction unit instructs the allocation unit to change a part of a wireless resource of the first physical channel to a wireless resource of the second physical channel, in a case where the accommodation state indicates a state of not requiring to release a session that is already accommodated in a wireless resource of the first physical channel and is associated to a priority degree higher than a predetermined level even when a part of a wireless resource of the first physical channel is changed to a wireless resource of the second physical channel.

(Supplementary Note 3)

The communication device according to Supplementary Note 1 or 2, further including:

a session control unit configured to release a session that is already accommodated in a wireless resource of the second physical channel and is associated to a priority degree lower than a predetermined level and accommodate, in a wireless resource of the second physical channel, a target session that is newly accommodated in the second physical channel, in a case where the accommodation state indicates a state of requiring to release a session that is already accommodated in the wireless resource of the first physical channel and is associated to a priority degree higher than a predetermined level when a part of a wireless resource of the first physical channel is changed to a wireless resource of the second physical channel.

(Supplementary Note 4)

The communication device according to Supplementary Note 3, wherein a priority degree lower than the predetermined level is a priority degree lower than a priority degree of a target session that is newly accommodated in the second physical channel.

(Supplementary Note 5)

The communication device according to Supplementary Note 3 or 4, wherein the determination unit, the allocation instruction unit, and the session control unit are included in a Radio Resource Management (RRM) function unit, and the allocation unit is included in an Operation and Maintenance (O&M) function unit.

(Supplementary Note 6)

The communication device according to any one of Supplementary Notes 3 to 5, wherein the determination unit further determines whether a first condition is satisfied, and determines the accommodation state when the first condition is satisfied, and the first condition includes a second condition where there is no room for a new session in a wireless resource of the second physical channel.

(Supplementary Note 7)

The communication device according to Supplementary Note 6, wherein the first condition further includes a third condition where an allocation amount of a wireless resource of the second physical channel before change does not reach an upper limit value.

(Supplementary Note 8)

The communication device according to Supplementary Note 7, wherein the determination unit determines whether the second condition is satisfied, determines whether the third condition is satisfied when it is determined that the second condition is satisfied, and determines the accommodation state when it is determined that the third condition is satisfied.

(Supplementary Note 9)

The communication device according to any one of Supplementary Notes 6 to 8, wherein the session control unit stores information for identifying a session that is accommodated in the second physical channel, and the determination unit determines whether to determine the first condition, based on information for identifying the session.

(Supplementary Note 10)

The communication device according to Supplementary Note 9, wherein information for identifying the session is information for identifying an urgency degree of the session.

(Supplementary Note 11)

The communication device according to any one of Supplementary Notes 1 to 10, wherein the allocation instruction unit controls in such a way as to change a part of a wireless resource of the first physical channel to a wireless resource of the second physical channel by a sub-frame unit.

(Supplementary Note 12)

The communication device according to any one of Supplementary Notes 1 to 11, wherein the allocation instruction unit controls the allocation unit in a periodical manner in such a way that a part or entirety of a wireless resource having no accommodated session in the second physical channel is changed to a wireless resource of the first physical channel.

(Supplementary Note 13)

The communication device according to any one of Supplementary Notes 1 to 12, wherein the first physical channel is a physical channel for unicast, and the second physical channel is a physical channel for multicast.

(Supplementary Note 14)

A communication device configured to support LTE Evolved Multimedia Broadcast Multicast Service (eM-BMS), the communication device including:

an allocation unit configured to allocate a wireless resource to each of a first physical channel and a second physical channel, wherein the allocation unit receives an instruction of changing a part of a wireless resource of the first physical channel to a wireless resource of the second physical channel from an allocation instruction unit, and executes a content of the instruction.

(Supplementary Note 15)

A system configured to support LTE Evolved Multimedia Broadcast Multicast Service (eMBMS), the system including:

a determination unit configured to determine, between a first physical channel and a second physical channel one of which is a physical channel for unicast and another of which is a physical channel for multicast, an accommodation state of a session in a wireless resource of the first physical channel;

an allocation unit configured to allocate a wireless resource to each of the first physical channel and the second physical channel; and an allocation instruction unit configured to instruct the allocation unit to change a part of a wireless resource of the first physical channel to a wireless resource of the second physical channel, according to the accommodation state.

(Supplementary Note 16)

A method for a communication device configured to support LTE Evolved Multimedia Broadcast Multicast Service (eMBMS), the method including:

determining, between a first physical channel and a second physical channel one of which is a physical channel for unicast and another of which is a physical channel for multicast, an accommodation state of a session in a wireless resource of the first physical channel; and instructing an allocation unit to change a part of a wireless resource of the first physical channel to a wireless resource of the second physical channel, according to the accommodation state, the allocation unit being configured to allocate a wireless resource to each of the first physical channel and the second physical channel.

(Supplementary Note 17)

A method for a communication device configured to support LTE Evolved Multimedia Broadcast Multicast Service (eMBMS), the method including:

allocating a wireless resource to each of a first physical channel and a second physical channel;

receiving an instruction of changing a part of a wireless resource of the first physical channel to a wireless resource of the second physical channel from an allocation instruction unit; and executing a content of the instruction.

(Supplementary Note 18)

A recording medium that records a program of a communication device configured to support LTE Evolved Multimedia Broadcast Multicast Service (eMBMS), the program including:

determining, between a first physical channel and a second physical channel one of which is a physical channel for unicast and another of which is a physical channel for multicast, an accommodation state of a session in a wireless resource of the first physical channel; and instructing an allocation unit to change a part of a wireless resource of the first physical channel to a wireless resource of the second physical channel, according to the accommodation state, the allocation unit being configured to allocate a wireless resource to each of the first physical channel and the second physical channel.

(Supplementary Note 19)

A recording medium that records a program of a communication device configured to support LTE Evolved Multimedia Broadcast Multicast Service (eMBMS), the program including:

allocating a wireless resource to each of a first physical channel and a second physical channel;

receiving an instruction of changing a part of a wireless resource of the first physical channel to a wireless resource of the second physical channel from an allocation instruction unit; and executing a content of the instruction.

REFERENCE SIGNS LIST

1 Communication device
2 Communication device
3 Communication device
4 Communication device
11 Determination unit
12 Allocation instruction unit
13 Allocation unit
31 Determination unit
32 Allocation instruction unit
33 Session control unit
41 Allocation unit
100 Network interface
101 Processor
102 Memory
200 First physical channel
201 Second physical channel

The invention claimed is:

1. A communication device for wireless resource allocation instructions configured to support LTE Evolved Multimedia Broadcast Multicast Service (eMBMS), the communication device comprising:

a determiner configured to determine, between a first physical channel and a second physical channel of which one is a physical channel for unicast and of which another is a physical channel for multicast, an accommodation state of a first session in a first wireless resource of the first physical channel; and an allocation instructor configured to instruct an allocator to change a part of the first wireless resource of the first physical channel to a second wireless resource of the second physical channel, according to the accommodation state, the allocator being configured to respectively allocate the first wireless resource and the second wireless resource to the first physical channel and the second physical channel, wherein the allocation instructor instructs the allocator to change the part of the first wireless resource of the first physical channel to the second wireless resource of the second physical channel, in a case where the accommodation state indicates a state of not requiring to release the first session that is already accommodated in the first wireless resource of the first physical channel and is associated to a first priority degree higher than a predetermined level even when the part of the first wireless resource of the first physical channel is changed to the second wireless resource of the second physical channel.

2. The communication device for wireless resource allocation instructions according to claim 1, further comprising:

a session controller configured to release a second session that is already accommodated in the second wireless resource of the second physical channel and is associated to a second priority degree lower than predetermined level, and accommodate, in the second wireless resource of the second physical channel, a target session that is newly accommodated in the second physical channel, in a case where the accommodation state indicates a state of requiring to release the first session that is already accommodated in the first wireless resource of the first physical channel and is associated to the first priority degree higher than the predetermined level when the part of the first wireless resource of the first physical channel is changed to the second wireless resource of the second physical channel.

3. The communication device for wireless resource allocation instructions according to claim 2, wherein
the second priority degree lower than the predetermined level is lower than a priority degree of a target session that is newly accommodated in the second physical channel.

4. The communication device for wireless resource allocation instructions according to claim 2, wherein
the determiner, the allocation instructor, and the session controller are included in a Radio Resource Management (RRM) entity, and
the allocator is included in an Operation and Maintenance (O&M) entity.

5. The communication device for wireless resource allocation instructions according to claim 2, wherein
the determiner further determines whether a first condition is satisfied, and determines the accommodation state when the first condition is satisfied, and
the first condition includes a second condition where there is no room for a new session in the second wireless resource of the second physical channel.

6. The communication device for wireless resource allocation instructions according to claim 5, wherein
the first condition further includes a third condition where an allocation amount of the second wireless resource of the second physical channel before change does not reach an upper limit value.

7. The communication device for wireless resource allocation instructions according to claim 6, wherein
the determiner determines whether the second condition is satisfied, determines whether the third condition is satisfied when it is determined that the second condition is satisfied, and determines the accommodation state when it is determined that the third condition is satisfied.

8. The communication device for wireless resource allocation instructions according to claim 5, wherein
the session controller stores information for identifying the second session that is accommodated in the second physical channel, and
the determiner determines whether to determine the first condition, based on information for identifying the second session.

9. The communication device for wireless resource allocation instructions according to claim 8, wherein
information for identifying the second session is information for identifying an urgency degree of the second session.

10. The communication device for wireless resource allocation instructions according to claim 1, wherein
the allocation instructor controls in such a way as to change the part of the first wireless resource of the first physical channel to the second wireless resource of the second physical channel by a sub-frame.

11. The communication device for wireless resource allocation instructions according to claim 1, wherein
the allocation instructor controls the allocator in a periodical manner in such a way that a part or an entirety of the second wireless resource having no accommodated session in the second physical channel is changed to the first wireless resource of the first physical channel.

12. The communication device for wireless resource allocation instructions according to claim 1, wherein
the first physical channel is a physical channel for unicast, and
the second physical channel is a physical channel for multicast.

13. A communication device for allocating a wireless resource configured to support LTE Evolved Multimedia Broadcast Multicast Service (eMBMS), the communication device comprising:
an allocator configured to respectively allocate a first wireless resource and a second wireless resource to a first physical channel and a second physical channel, wherein
the allocator receives an instruction of changing a part of the first wireless resource of the first physical channel to the second wireless resource of the second physical channel from an allocation instructor, and executes a content of the instruction, wherein
the instruction is that in a case where the accommodation state indicates a state of not requiring to release a first session that is already accommodated in the first wireless resource of the first physical channel and is associated to a first priority degree higher than a predetermined level even when a part of the first wireless resource of the first physical channel is changed to the second wireless resource of the second physical channel.

14. A communication system for wireless resource allocation instructions configured to support LTE Evolved Multimedia Broadcast Multicast Service (eMBMS), the system comprising:
a determiner configured to determine, between a first physical channel and a second physical channel of which one is a physical channel for unicast and of which another is a physical channel for multicast, an accommodation state of a first session in a first wireless resource of the first physical channel;
an allocator configured to respectively allocate a first wireless resource and a second wireless resource to the first physical channel and the second physical channel; and
an allocation instructor configured to instruct the allocator to change a part of the first wireless resource of the first physical channel to the second wireless resource of the second physical channel, according to the accommodation state, wherein
the allocation instructor instructs the allocator to change the part of the first wireless resource of the first physical channel to the second wireless resource of the second physical channel, in a case where the accommodation state indicates a state of not requiring to release the first session that is already accommodated in the first wireless resource of the first physical channel and is associated to a first priority degree higher than a predetermined level even when the part of the first wireless resource of the first physical channel is changed to the second wireless resource of the second physical channel.

15. An allocation method for wireless resource allocation instructions configured to support LTE Evolved Multimedia Broadcast Multicast Service (eMBMS), the method comprising:

determining, between a first physical channel and a second physical channel which one is a physical channel for unicast and of which another is a physical channel for multicast, an accommodation state of a first session in a first wireless resource of the first physical channel; and instructing an allocator to change a part of the first wireless resource of the first physical channel to a second wireless resource of the second physical channel, according to the accommodation state, the allocator being configured to respectively allocate the first wireless resource and the second wireless resource to the first physical channel and the second physical channel, wherein executing by the allocator to change the part of the first wireless resource of the first physical channel to the second wireless resource of the second physical channel, in a case where the accommodation state indicates a state of not requiring to release the first session that is already accommodated in the first wireless resource of the first physical channel and is associated to a first priority degree higher than a predetermined level even when a part of the first wireless resource of the first physical channel is changed to the second wireless resource of the second physical channel.

16. An allocation method for wireless resource allocation instructions configured to support LTE Evolved Multimedia Broadcast Multicast Service (eMBMS), the method comprising:

respectively allocating a first wireless resource and a second wireless resource to a first physical channel and a second physical channel;

receiving an instruction of changing a part of the first wireless resource of the first physical channel to the second wireless resource of the second physical channel from an allocation instructor; wherein the instruction is to change the part of the first wireless resource of the first physical channel to the second wireless resource of the second physical channel, in a case where the accommodation state indicates a state of not requiring to release the first session that is already accommodated in the first wireless resource of the first physical channel and is associated to a first priority degree higher than a predetermined level even when the part of the first wireless resource of the first physical channel is changed to the second wireless resource of the second physical channel.

\* \* \* \* \*